(12) United States Patent
Li

(10) Patent No.: US 12,425,083 B2
(45) Date of Patent: Sep. 23, 2025

(54) BEAM MANAGEMENT METHOD, BEAM MANAGEMENT DEVICE AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 108 days.

(21) Appl. No.: 18/003,037

(22) PCT Filed: Jul. 31, 2020

(86) PCT No.: PCT/CN2020/106070
§ 371 (c)(1),
(2) Date: Dec. 22, 2022

(87) PCT Pub. No.: WO2022/021270
PCT Pub. Date: Feb. 3, 2022

(65) Prior Publication Data
US 2023/0246683 A1   Aug. 3, 2023

(51) Int. Cl.
*H04B 7/06* (2006.01)
*H04B 7/08* (2006.01)

(52) U.S. Cl.
CPC ......... *H04B 7/0617* (2013.01); *H04B 7/0695* (2013.01); *H04B 7/086* (2013.01); *H04B 7/088* (2013.01)

(58) Field of Classification Search
CPC .... H04B 7/0617; H04B 7/0695; H04B 7/086; H04B 7/088
See application file for complete search history.

(56) References Cited

U.S. PATENT DOCUMENTS

| 2017/0212210 | A1* | 7/2017  | Chen .................... G01S 5/06 |
| 2019/0147711 | A1* | 5/2019  | Grom ..................... G08B 5/38 |
|              |     |         | 340/539.13 |
| 2019/0372688 | A1* | 12/2019 | Sadiq .................. H04W 64/00 |
| 2020/0142023 | A1  | 5/2020  | Markhovsky et al. |
| 2020/0182959 | A1* | 6/2020  | Markhovsky ........... G01S 19/05 |

(Continued)

FOREIGN PATENT DOCUMENTS

| CN | 110574327 A | 12/2019 |
| CN | 111182579 A | 5/2020  |

(Continued)

OTHER PUBLICATIONS

Request for the Submission of an Opinion for Korean Application No. 10-2023-7001952, issued on Oct. 10, 2023, 11 pages.

(Continued)

*Primary Examiner* — Freshteh N Aghdam
(74) *Attorney, Agent, or Firm* — Finnegan, Henderson, Farabow, Garrett & Dunner, L.L.P.

(57) ABSTRACT

A beam management method is performed by a first device, and includes: receiving reference signal configuration information; and measuring reference signals based on the reference signal configuration information, and sending a measurement report, wherein the measurement report includes first arrival path information of beams corresponding to the reference signals.

14 Claims, 5 Drawing Sheets

(56) References Cited

U.S. PATENT DOCUMENTS

2021/0389410 A1* 12/2021 Yerramalli ............ H04W 64/00

FOREIGN PATENT DOCUMENTS

| KR | 20200088654 A | 7/2020 | | |
|---|---|---|---|---|
| WO | WO-2014128627 A1 * | 8/2014 | ............... | G01S 3/38 |

OTHER PUBLICATIONS

Notice of Reasons for Refusal for Japanese Application No. 2022-581668, issued on Oct. 10, 2023, 6 pages.

LG Electronics, "Discussion on necessity and details for physical-layer procedures to support UE/gNB measurements", 3GPP TSG RAN WG1 #96bis, R1-1904202, Xi'an, China, Apr. 8-12, 2019, 10 pages.

LG Electronics, "Discussion on UE and gNB measurements for NR Positioning", 3GPP TSG RAN WG1 #96bis, R1-1904201, Xi'an, China, Apr. 8-12, 2019, 4 pages.

LG Electronics, "UE and gNB measurements for NR positioning", 3GPP TSG RAN WG1 #98bis, R1-1911230, Chongqing, P.R. China, Oct. 14-20, 2019, 18 pages.

LG Electronics, "Discussion on UE and gNB measurements for NR Positioning", 3GPP TSG RAN WG1 #98bis, R1-1910588, Chongqing, China, Oct. 14-20, 2019, 6 pages.

Extended European Search Report issued in Application No. 20947780.1 dated Mar. 20, 2024, 10 pages.

Extended European Search Report issued in Application No. 20947780.1 dated Aug. 1, 2024, 10 pages.

Spreadtrum Communications, "Discussion on potential positioning enhancements", 3GPP TSG RAN WG1 Meeting #101-e, R1-2003988 e-Meeting, May 25-Jun. 5, 2020, 3 pages.

First Office Action for Chinese Application No. 202211446922.6, dated May 22, 2025, 11 pages.

* cited by examiner

BEAM MANAGEMENT METHOD, BEAM MANAGEMENT DEVICE AND STORAGE MEDIUM

CROSS-REFERENCE TO RELATED APPLICATION

This application is a U.S. national phase application of International Application No. PCT/CN2020/106070, filed on Jul. 31, 2020, the content of which is hereby incorporated by reference in its entirety.

TECHNICAL FIELD

The disclosure relates to afield of communication technologies, and more particularly, to a beam management method, a beam management apparatus, and a storage medium.

BACKGROUND

In the related art, in New Radio (NR) Rel-16, the positioning measurement of the terminal in the connected state is discussed, and positioning-purpose reference signals are defined. The positioning-purpose reference signals include the downlink Positioning Reference Signal (PRS) and uplink Sounding Reference Signal (SRS) for positioning. For positioning the terminal, the line of sight (LOS) path is important. The measured value of the LOS path can help to effectively improve the positioning accuracy. Regardless of whether the signal strength value, the time value or the angle value is measured, in order to achieve the highest positioning accuracy, the LOS path needs to be determined.

SUMMARY

According to a first aspect of the embodiments of the disclosure, there is provided a beam management method executed by a first device. The method includes:
receiving reference signal configuration information; measuring reference signals based on the reference signal configuration information, and sending a measurement report, in which the measurement report includes first arrival path information of beams corresponding to the reference signals.

According to a second aspect of embodiments of the disclosure, there is provided a beam management method performed by a second device. The method includes:
sending reference signal configuration information; and receiving a measurement report obtained and sent by measuring reference signals by a first device based on the reference signal configuration information, in which the measurement report includes first arrival path information of beams corresponding to the reference signals.

According to a third aspect of embodiments of the disclosure, there is provided a beam management device. The device includes:
a processor; and a memory for storing instructions executable by the processor;
in which the processor is configured to execute the beam management method described in the first aspect or any implementation manner of the first aspect.

According to a fourth aspect of embodiments of the disclosure, there is provided a beam management device. The device includes:
a processor; and a memory for storing instructions executable by the processor;
in which the processor is configured to execute the beam management method described in the second aspect or any implementation manner of the second aspect.

According to a fifth aspect of embodiments of the disclosure, there is provided a non-transitory computer-readable storage medium, in which when instructions stored in the storage medium are executed by a processor of a first device, the first device can execute the beam management method described in the first aspect or any implementation manner of the first aspect.

According to a sixth aspect of embodiments of the disclosure, there is provided a non-transitory computer-readable storage medium, when instructions stored in the storage medium are executed by a processor of a second device, the second device can execute the beam management method described in the second aspect or any implementation manner of the second aspect.

It is understandable that the foregoing general description and the following detailed description are explanatory and examples only and are not used to limit the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Figure 1:
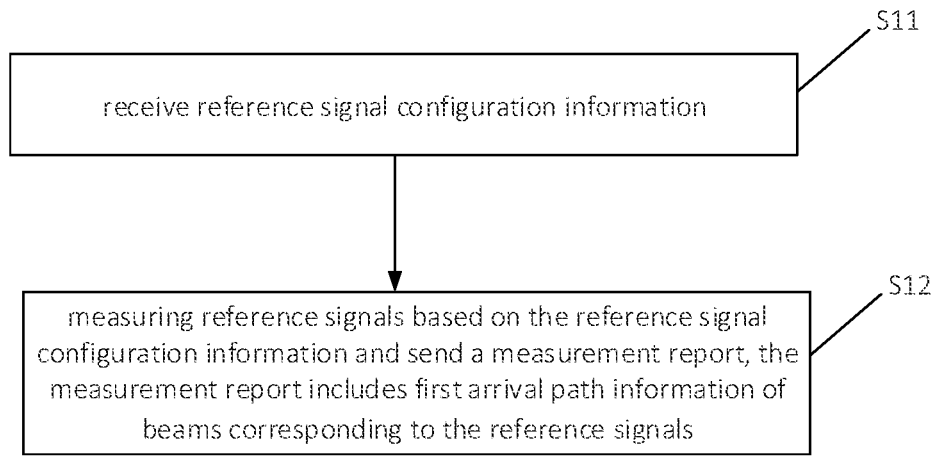
FIG. 1 is a flowchart illustrating a beam management method according to some embodiments.

Embodiments will be described in detail herein, examples of which are illustrated in the accompanying drawings. When the following description refers to the drawings, the same numerals in different drawings refer to the same or similar elements unless otherwise indicated. The implementations described in the illustrative examples below are not intended to represent all implementations consistent with this disclosure. Rather, they are merely examples of apparatus and methods consistent with some aspects of the disclosure as recited in the appended claims.

In the related art, the terminal communicates with the wireless network device, such as the wireless access device and the core network device, based on a cellular network and can implement a positioning measurement function. For example, in new radio (NR) Rel-16, the positioning measurement of the terminal in the connected state is discussed, and positioning-purpose reference signals are defined. The positioning-purpose reference signals include the Positioning Reference Signal (PRS) for downlink positioning and Sounding Reference Signal (SRS) for uplink positioning. The positioning measurement includes the measurement performed by the terminal and the measurement performed by the wireless network device. The measured value includes the measured signal strength value, the signal transmission time value, and the channel arrival or departure angle value.

In the related art, the measured value of the line of sight (LOS) path can help to effectively improve the positioning accuracy. Therefore, when measuring the signal strength value, the time value or the angle value, in order to achieve the highest positioning accuracy, it is necessary to measure the LOS path. However in fact, it is possible that there is no LOS path. An earliest arrival path is closest to the LOS path or is the LOS path. Therefore, in the discussion of the positioning problem of Rel-16, it is desired to find the first arrival path, that is, the earliest arrival path.

In the related art, in order to determine the first arrival path, a large number of positioning-purpose reference signals need to be sent. Taking the downlink as an example, the base station uses each transmission beam (Tx beam) to send the positioning reference signal, and for each Tx beam sent by the base station, the terminal needs to use all of its receiving beams (Rx beams) to receive the positioning reference information sent by the Tx beam, so as to finally obtain the first arrival path. Therefore, in the worst case, the number of reference signals to be measured to determine the first arrival path is the product of the number of Tx beams of the base station and the number of Rx beams of the terminal. In uplink, in the worst case, the number of reference signals to be measured to determine the first arrival path is the product of the number of Tx beams of the terminal and the number of Rx beams of the base station. However, the more reference signals that need to be measured, the more energy the terminal consumes, the longer time required for positioning measurement, the greater the positioning delay and the worse the positioning accuracy.

In order to reduce the energy consumption of the terminal in obtaining the first arrival path, the Tx beam and the Rx beam corresponding to the first arrival path can be determined during the early stage, i.e., the beam management stage, so that the number of reference signals to be measured can be reduced during the measurement stage. However, in the Rel-16, the measurement in the beam management stage only includes the measurement of the signal strength of the beam. The signal strength includes the Layer1-Reference Signal Received Power (L1-RSRP)/Layer1-Received Signal Strength Indication (L1-RSSI). The result of the measurement report includes a reference signal identifier (ID) and the L1-RSRP/L1-RSSI.

In the related art, the first arrival path can be determined based on the first arrival path information (such as the signal time-of-flight value). However, the existing measurement and reporting of the beam management do not include the time-of-flight of the signal on each path, so the first arrival path used for sending the positioning-purpose reference signal cannot be found in advance, which leads to sending and measuring a large number of positioning reference signals to find the first arrival path, thereby increasing the power consumption of the terminal, prolonging the positioning measurement time, and reducing the positioning accuracy.

In view of this, embodiments of the disclosure provide a beam management method. In the process of beam management, the measurement report obtained and sent by measuring reference signals includes first arrival path information of beams corresponding to the reference signals, and subsequently the first arrival path is determined based on the first arrival path information. Therefore, first arrival path can be determined as quickly as possible, the power consumption of the terminal can be reduced, the positioning delay can be reduced and the positioning accuracy can be improved.

In an example, the first arrival path information represents whether the beam corresponding to each reference signal is a first arrival path, or the first arrival path information includes time-of-flight information of the reference signals.

In another example, during the beam management process, when performing the measurement of the reference signals, not only the signal strength values of the reference signals are measured and sent back, but also the time-of-flight of the reference signals are measured and sent back. Therefore, the base station can configure a reference signal for positioning measurement according to the signal strength value and the time-of-flight. For example, the base station configures a positioning reference signal with a short time-of-flight as much as possible. Therefore, the terminal can find the first arrival path as quickly as possible when performing the positioning measurement, thereby reducing the energy consumption of the terminal, reducing the positioning delay and improving the positioning accuracy.

The beam measurement method according to embodiments of the disclosure can be applied in devices that perform beam management and perform reference signal transmission interaction. For example, the method may be performed between a terminal and a network device, such as a base station. For convenience of description in embodiments of the disclosure, a device that receives and measures the reference signal and sends the measurement report is referred to as a first device, such as a terminal, and a device that sends the reference signal and configures the reference signal is referred to as a second device, such as a base station and other network devices.

The first device involved in the disclosure may be a terminal, also referred to as terminal equipment, user equipment (UE), mobile station (MS), mobile terminal (MT), etc., which is a device that provides voice and/or data connectivity to users. The device, for example, the terminal may be a handheld device, a vehicle-mounted device, an Internet of Things (I) device, an Industrial Internet of Things (IIoT) device with a wireless connection function, and the like. At present, some examples of terminals are: Mobile Phone, Pocket Personal Computer (PPC), palmtop computer, Personal Digital Assistant (PDA), notebook computer, tablet computer, wearable device, or vehicle equipment, etc. In addition, when it is a vehicle networking (V2X) communication system, the first device may also be an in-vehicle device. It is understandable that embodiments of the disclosure do not limit the specific technology and specific device form adopted by the first device.

In embodiments of the disclosure, the second device includes a wireless network device that communicates based on a cellular network and may include a radio access network device such as a base station, or a core network device such as a location management function (LMF). Further, the wireless access network device involved in the disclosure may be a base station, an evolved node B (base station), a home base station, an access point in a wireless fidelity (WIFI) system, an AP, a wireless relay node, a wireless backhaul node, a transmission point (TP), a transmission and reception point (TRP), a gNB in the NR system, or a component or part that constitutes a base station. When it is a device-to-device communication (D2D) or vehicle to everything (V2X) communication system, the second device may also be a terminal, such as a vehicle-mounted device.

In embodiments of the disclosure, the second device may also be a wireless local area network device that communicates based on WLAN, a Bluetooth device that communicates based on Bluetooth, or an Ultra Wide Band (UWB) device that communicates based on UWB equipment. It is understandable that the second type of positioning nodes may also be sensors that communicate based on one or more wireless communication technologies among WLAN, Bluetooth and UWB. It is understandable that, in embodiments of the disclosure, the specific technology and specific device form adopted by the second device are not limited.

FIG. 1 is a flowchart illustrating a beam management method according to some embodiments. As illustrated in FIG. 1, the beam management method is executed by a first device and includes the following.

In step S11, reference signal configuration information is received.

In step S12, reference signals are measured based on the reference signal configuration information, and a measurement report is sent. The measurement report includes first arrival path information of beams corresponding to the reference signals.

In embodiments of the disclosure, the reference signal configuration information may be sent by the second device and received by the first device.

Figure 2:
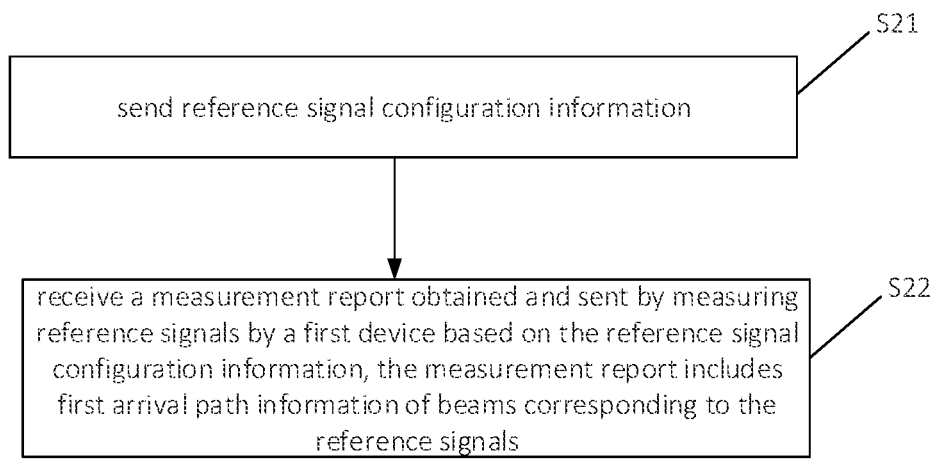
FIG. 2 is a flowchart illustrating a beam management method according to some embodiments.

FIG. 2 is a flowchart illustrating a beam management method according to some embodiments. As illustrated in FIG. 2, the beam management method is executed by a second device and includes the following.

In step S21, reference signal configuration information is sent.

In step S22, a measurement report obtained and sent by measuring reference signals by a first device based on the reference signal configuration information is received. The measurement report includes first arrival path information of beams corresponding to the reference signals.

In embodiments of the disclosure, the second device sends reference signal configuration information, and the first device receives the reference signal configuration information to measure the reference signals and send a measurement report. The measurement report includes first arrival path information of beams corresponding to the reference signals. The second device receives the measurement report obtained and sent by measuring the reference signals based on the reference signal configuration information by the first terminal. The measurement report includes first arrival path information of beams corresponding to the reference signals. The reference signal for positioning measurement can be configured based on the first arrival path information. For example, the positioning reference signal with a short time-of-flight can be configured. Therefore, the first device can find the first arrival path as quickly as possible during the positioning measurement process, thereby reducing the energy consumption of the terminal, reducing the positioning delay and improving the positioning accuracy.

Embodiments of the disclosure describe the beam management method involved in embodiments of the disclosure in combination with practical applications.

In an implementation, the reference signal configuration information sent by the second device (i.e., the reference signal configuration information received by the first device) may include, for example, reference signal identifiers (ID), time domain locations, frequency domain locations, purposes of the reference signals (e.g., for beam management), and whether repeated transmission is enabled (i.e., whether repetition is on or off). When the repetition is on, it indicates that the second device repeatedly transmits reference signals using the same Tx beam, that is, the Tx beams of the reference signals are the same. In this case, the first device may use its own different Rx beams to receive the reference signals respectively, and find its own optimal Rx beam. If the repetition is off, it means that the second device sends reference signals using different Tx beams, that is, the Tx beams corresponding to the reference signals are different. The reference signal configuration information may further include a Transmission Reception Point (TRP) ID or a cell ID corresponding to the reference signals. The cell ID may be a serving cell ID or a neighbor cell ID of the first device. The reference signal identifier may be a Synchronization Signal Block (SSB) identifier, a Channel-state information RS (CSI-RS) identifier, a PRS identifier or an SRS identifier.

In embodiments of the disclosure, the first device receives the reference signal configuration information to measure the beams corresponding to the reference signals.

In embodiments of the disclosure, the measurements of the beams corresponding to the reference signals performed by the first device includes determining first arrival path information corresponding to the beams.

In embodiments of the disclosure, the first arrival path information may represent whether each beam corresponding to the reference signals is a first arrival path or not. For example, the first arrival path information indicates that the beam corresponding to each reference signal is the first arrival path, or the first arrival path information indicates that the beam corresponding to each reference signal is not the first arrival path. In an example, the first arrival path information may represent yes or no, indicating whether the beam corresponding to each reference signal identifier is the first arrival path and the feedback information indicates yes or no.

In embodiments of the disclosure, the first arrival path information may include time-of-flight information of the reference signals.

In one implementation, measuring the reference signals in embodiments of the disclosure may include measuring the time-of-flight of each reference signal.

The time-of-flight information in embodiments of the disclosure includes sorting information obtained by sorting a plurality of arrival paths according to the time-of-flight. In an example, the first arrival path information represents a sorting order of the time-of-flight from the minimal to the maximal. An arrival path having a shortest time-of-flight is the first arrival path (represented for example by 2 bits equaling to for example 00), an arrival path having a second shortest time-of-flight is the second arrival path (represented by 2 bits equaling to for example 01), and an arrival path with a third shortest time-of-flight is the third arrival path (represented by 2 bits equaling to for example 11), and so on, to represent a plurality of sorted arrival paths.

The time-of-flight information in embodiments of the disclosure includes time-of-flight values, that is, the first arrival path information represents the time-of-flight values. In one implementation, the time-of-flight values include an absolute time-of-flight value and/or relative values relative to the absolute time-of-flight value. In an example, the absolute time-of-flight value corresponds to the reference signal with a shortest time-of-flight. For example, the first arrival path information corresponding to the shortest time-of-flight value indicates the absolute value of the shortest time-of-flight, and the first arrival path information corresponding to other time-of-flight values indicates relative values relative to the absolute value of the shortest time-of-flight. In another implementation, the time-of-flight values include a specified value, and/or relative values relative to the specified value. In one example, the specified value corresponds to the reference signal with the shortest timeof-flight. For example, the first arrival path information corresponding to the shortest time-of-flight value indicates 0, and the first arrival path information corresponding to other time-of-flight values indicates relative values relative to 0.

In an implementation, measuring the beams corresponding to the reference signals in embodiments of the disclosure includes measuring the signal strength value of each reference signal.

In one implementation, the first device measures the signal strength value and the time-of-flight of each reference signal, and stores a one-to-one correspondence between reference signal identifiers, receiving beams, signal strength values, and time-of-flight. In an example, the correspondence between the reference signal identifiers, the receiving beams, the signal strength values, and the time-of-flight may be as shown in Table 1 below.

TABLE 1

| reference signal ID | receiving beam | signal strength value | time-of-flight |
|---|---|---|---|
| SSB index#0 | Rx beam#0 | L1_RSRP#0/L1_RSSI#0 | T0 |
| SSB index#1 | Rx beam#1 | L1_RSRP#1/L1_RSSI#1 | T1 |
| CSI-RS resource index(CRI)#2 | Rx beam#2 | L1_RSRP#2/L1_RSSI#2 | T2 |

In embodiments of the disclosure, the measurement report sent by the first device may further include one or more reference signal identifiers. The reference signal identifier may be a Synchronization Signal Block (SSB) identifier, a Channel-state information RS (CSI-RS) identifier, a PRS identifier or an SRS identifier.

Further, in embodiments of the disclosure, the measurement report sent by the first device may further include a Transmission Reception Point (TRP) identifier and/or a cell identifier. The cell identifier may be a serving cell identifier or a neighbor cell identifier.

In embodiments of the disclosure, there is a correspondence between the one or more reference signal identifiers sent by the first device and the first arrival path information. Alternatively, there is a correspondence between the one or more reference signal identifiers and the time-of-flight information of the reference signals.

Further, the one or more reference signal identifiers may be in a correspondence with the signal strength value.

In embodiments of the disclosure, the first device may send a set number of reference signal identifiers with the strongest signal strength value, and/or send a set number of reference signal identifiers with the shortest signal time-of-flight.

In an example, the first device sends N (N is a natural number, for example, N is 1, 2 or 4) reference signal identifiers with the strongest signal strength value as well as the corresponding signal strength value. When N is 1, the measurement report includes the reference signal identifier with the strongest signal strength value and the corresponding signal strength value, and the signal strength value may be the absolute signal strength value corresponding to the reference signal with the strongest signal strength value. When N is greater than 1, the measurement report includes reference signal identifiers with the strongest signal strength value, the absolute value of the strongest signal strength value, and relative values of other signal strength values relative to the absolute value of the strongest signal strength value.

In embodiments of the disclosure, the measurement report sent by the first device further includes the time-of-flight. The one or more reference signal identifiers included in the measurement report are determined based on the signal strength value and/or the time-of-flight, which can be understood that there is a correspondence between the signal strength values, the time-of-flight and the reference signal identifiers.

In one implementation, the one or more reference signal identifiers correspond to one or more reference signals with the strongest signal strength value among the measured signal strength values. That is, the measurement report may include the reference signal identifiers, the signal strength value, and the time-of-flight values of N signal signals with the strongest signal strength value. In another implementation, the one or more reference signal identifiers correspond to one or more reference signals with the shortest time-of-flight among the measured time-of-flight. That is, the measurement report may include the reference signal identifiers, the signal strength values and the time-of-flight value of the reference signals having the shortest time-of-flight. In yet another implementation, the one or more reference signal identifier corresponds to one or more reference signals with a maximum weighted sum of measured signal strength value and measured time-of-flight. That is, the signal strength value and the time-of-flight are respectively multiplied by respective weighted values to obtain the weighted sum, and the reference signal identifiers, the signal strength values, and the time-of-flight values of N reference signals with the maximum weighted sum are sent.

It is understandable that, in embodiments of the disclosure, the value of N mentioned above is a positive integer greater than or equal to 1.

In embodiments of the disclosure, for each reference signal and each Rx beam of the first device, one or more arrival paths may be measured. If the first device can distinguish arrival times for the multiple paths, then there are multiple time-of-flight values measured by the first device.

In an implementation, if the first arrival path information indicates whether the beams corresponding to the reference signals each is the first arrival path or not, when the first device measures multiple paths, the first one of the multiple paths is used. In another implementation, if the first arrival path information represents the sorting information of the time-of-flight, when the multiple paths are measured, the first one of the multiple paths is used. In another implementation, if the first arrival path information represents the time-of-flight values, the first device may send the time-of-flight values and the signal strength values of the multiple paths, or send the time-of-flight value and signal strength value of one path, or send a weighted average of the signal strength values of multiple paths and a weighted average of the time-of-flight values of multiple paths.

Further, in embodiments of the disclosure, the time-of-flight sent by the first device to the second device may be a one-way time-of-flight, a two-way time-of-flight, or both the one-way time-of-flight and the two-way time-of-flight.

In one implementation, the time-of-flight includes the one-way time-of-flight. Assuming that the time when the second device sends a reference signal is T1, and the time when the first device receives the reference signal is T2, then the one-way time-of-flight is T2−T1.

Figure 3:
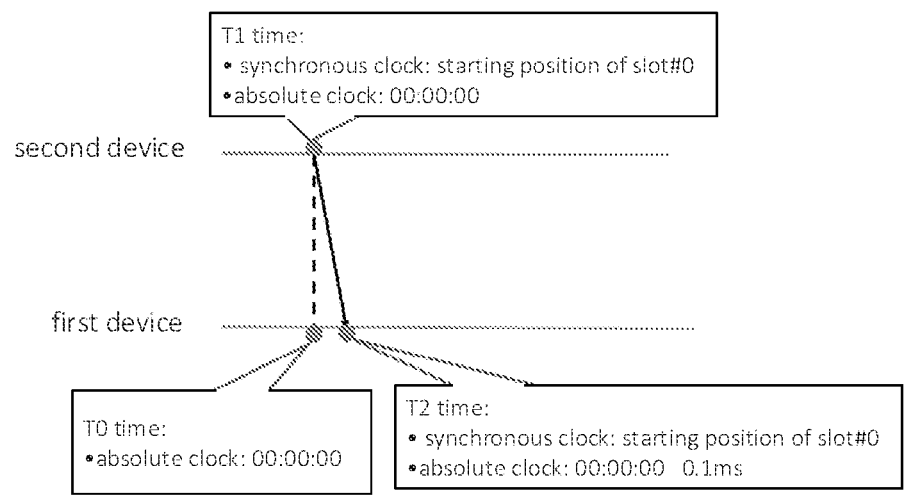
FIG. 3 is a schematic diagram illustrating a synchronous clock and an absolute clock according to some embodiments.

There may be various ways to define T1 in embodiments of the disclosure. In one way, T1 is defined based on a synchronous clock. The first device and the second device are synchronous systems, and the synchronous clocks of the two devices are illustrated in FIG. 3. For example, when the first device is a terminal and the second device is a base station, the downlink synchronization means that the base station sends the reference signal at the starting position of slot #0 and the terminal receives the reference signal at the starting position of slot #0, then the difference between the starting position of slot #0 on the terminal side and the starting position of slot #0 on the base station side is the transmission time of the reference signal. Therefore, if the Tx beam of the reference signal sent by the second device and the Rx beam of the reference signal received by the first device are the same as those of the downlink synchronization, then T2−T1 is 0. If they are different, T2−T1 may be a positive value or may be a negative value. Therefore, T1 here is defined to be the time when the second device sends the reference signal that is considered by the first device, (i.e., the time displayed by the synchronized clock) after the first device is synchronized with the second device (mainly downlink synchronization, that is, the first device performs synchronization according to the reference signal sent by the second device).

In another implementation, T1 may be defined based on an absolute clock. The time of the absolute clock of the second device at time T1 is illustrated as FIG. 3. The time of the absolute clock of the first device is exactly the same as the time of the absolute clock of the second device, so it is required that the second device notifies the first device of the time of the clock at the time of T1 (which can be an explicit notification, such as sending the time information, or which can be an implicit notification, such as representing different times by different reference signal IDs/frequency domains/sequences). The difference between the time of the clock when the first device receives the reference signal and the time of the clock at time T1 is the one-way time-of-flight.

In another implementation, T1 may be another reference time. For example, T1 is the time when the first device receives the reference signal sent by a third device, and the time when the first device receives the reference signal from the second device is 12, so that T2−T1 means a time difference between the time when the first device receives the reference signal from the second device and the time when the first device receives reference signal from the third device.

It is understandable that, in the above example, the second device sends the reference signal and the first device measures the time. However, in the actual execution process, it is possible that the first device sends the reference signal and the second device measures the time. If necessary, the measurement report of the time also needs to be sent to the opposite party.

In embodiments of the disclosure, if the definition of T1 is different, then the meaning of the corresponding time-of-flight value is different. Therefore, the time-of-flight value involved in embodiments of the disclosure may be a general time measurement value. In some cases, the time measurement value is the time-of-flight, and in some cases, the time measurement value is the difference of receiving time.

In one implementation, the time-of-flight includes the two-way time-of-flight. For example, the time when the second device sends the first reference signal is T1, the time when the first device receives the first reference signal is T2, the time when the first device sends the second reference signal is T3, and the time when the second device receives the second reference signal is T4, such that the two-way time-of-flight is T4−T1−(T3−T2).

It is understandable that, in embodiments of the disclosure, if the time-of-flight includes the two-way time-of-flight, the first device needs to send the value of T3−T2 to the second device.

It is understandable that, in embodiment of the disclosure, the two-way time-of-flight may be measured by the first device, by the second device, or by both the first device and the second device. If necessary, the measurement report of the time needs to be sent to the opposite party.

The beam management method according to embodiments of the disclosure is used for positioning. In addition to the reference signal ID and the signal strength value, the beam measurement and feedback includes, the time-of-flight which is used by the second device to configure the positioning-purpose reference signal based on the time measurement value. Therefore, when the first device is performing the positioning measurement, the first device can find the first arrival path as quickly as possible, thereby reducing the positioning delay and improving the positioning accuracy.

It is understandable that, the beam management method provided by the embodiments of the present disclosure can be applied to the implementation process of the interaction between the first device and the second device. For the implementation process of the beam management method implemented by the interaction between the first device and the second device, reference may be made to the relevant descriptions of the foregoing embodiments, and details are not described herein again.

Based on the same concept, embodiments of the disclosure also provide a beam management apparatus.

It is understandable that, in order to implement the above-mentioned functions, the beam management apparatus according to embodiments of the disclosure includes corresponding hardware structures and/or software modules for executing each function. Combining with the units and algorithm steps of each example disclosed in the embodiments of the disclosure, the embodiments of the disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the disclosure.

Figure 4:
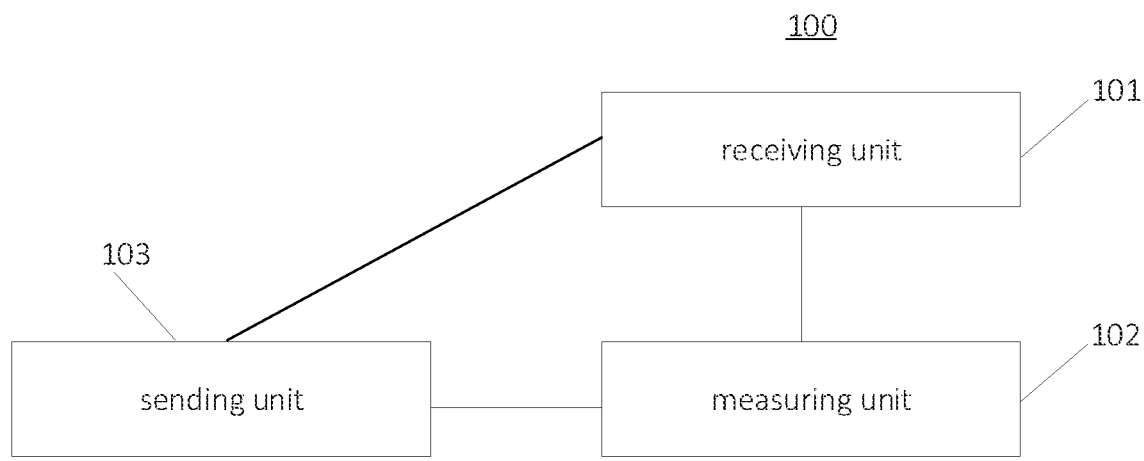
FIG. 4 is a block diagram illustrating a beam management apparatus according to some embodiments.

FIG. 4 is a block diagram illustrating a beam management apparatus according to some embodiments. As illustrated in FIG. 4, the beam management apparatus 100 is applied to the first device. The apparatus 100 includes a receiving unit 101, a measuring unit 102 and a sending unit 103.

The receiving unit 101 is configured to receive reference signal configuration information. The measuring unit 102 is configured to measure a reference signal based on the reference signal configuration information. The sending unit 103 is configured to send a measurement report. The measurement report includes first arrival path information of beams corresponding to the reference signals.

In an implementation, the first arrival path information indicates that the beam corresponding to the reference signal is a first path of arrival, or the first arrival path information indicates that the beam corresponding to the reference signal is not a first path of arrival.

In an implementation, the first arrival path information includes time-of-flight information of the reference signals.

In an implementation, the time-of-flight information includes sorting information obtained by sorting the plurality of arrival paths according to the time-of-flight.

In an implementation, the time-of-flight information includes time-of-flight values.

In an implementation, the time-of-flight values include an absolute time-of-flight value and/or relative values relative to the absolute time-of-flight value.

In an implementation, the time-of-flight values include a specified value, and/or relative values relative to the specified value.

In an implementation, the absolute time-of-flight value or the specified value corresponds to the reference signal with a shortest time-of-flight.

In an implementation, the time-of-flight includes a one-way time-of-flight or a two-way time-of-flight.

In an implementation, the measurement report further includes one or more reference signal identifiers.

In an implementation, the reference signal identification is determined based on a signal strength value and/or the time-of-flight.

In an implementation, the one or more reference signal identifiers correspond to one or more reference signals with a strongest signal strength value among measured signal strength values, and/or the one or more reference signal identifiers correspond to one or more reference signals with a shortest time-of-flight among measured time-of-flight; and/or the one or more reference signal identifiers correspond to one or more reference signals with a maximum weighted sum of measured signal strength value and measured time-of-flight.

Figure 5:
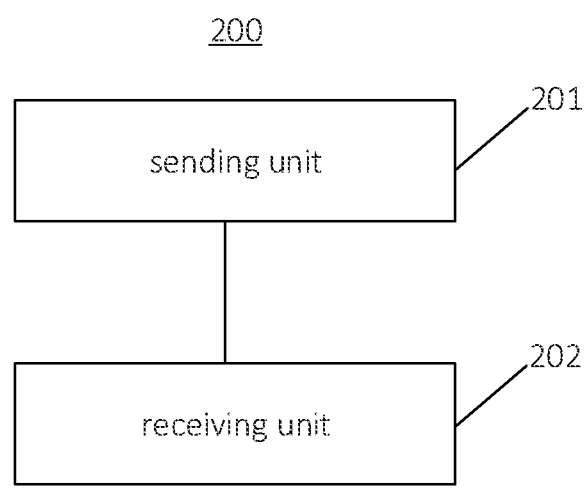
FIG. 5 is a block diagram illustrating a beam management apparatus according to some embodiments.

FIG. 5 is a block diagram illustrating a beam management apparatus according to some embodiments. As illustrated in FIG. 5, the beam management apparatus 200 is applied to the second device. The apparatus 200 includes a sending unit 201 and a receiving unit 202.

The sending unit 201 is configured to send reference signal configuration information. The receiving unit 202 is configured to receive a measurement report obtained and sent by measuring reference signals by a first device based on the reference signal configuration information, in which the measurement report includes first arrival path information of beams corresponding to the reference signals.

In an implementation, the first arrival path information indicates that the beam corresponding to the reference signal is a first arrival path, or the first arrival path information indicates that the beam corresponding to the reference signal is not a first arrival path.

In an implementation, the first arrival path information includes time-of-flight information of the reference signals.

In an implementation, the time-of-flight information includes sorting information obtained by sorting a plurality of arrival paths according to time-of-flight.

In an implementation, the time-of-flight information includes time-of-flight values.

In an implementation, the time-of-flight values include an absolute time-of-flight value, and/or relative values relative to the absolute time-of-flight value.

In an implementation, the time-of-flight values include a specified value, and/or relative values relative to the specified value.

In an implementation, the absolute time-of-flight value or the specified value corresponds to the reference signal with a shortest time-of-flight.

In an implementation, the time-of-flight includes a one-way time-of-flight or a two-way time-of-flight.

In an implementation, the measurement report further includes one or more reference signal identifiers.

In an implementation, the reference signal identifier is determined based on a signal strength value and/or a time-of-flight.

In an implementation, the one or more reference signal identifiers correspond to one or more reference signals with a strongest signal strength value among measured signal strength values, and/or the one or more reference signal identifiers correspond to one or more reference signals with a shortest time-of-flight among measured time-of-flight; and/or the one or more reference signal identifiers correspond to one or more reference signals with a maximum weighted sum of measured signal strength value and measured time-of-flight.

Regarding the apparatus in the above-mentioned embodiments, the specific manner in which each module performs operations has been described in detail in the embodiments of the method, and will not be described in detail here.

Figure 6:
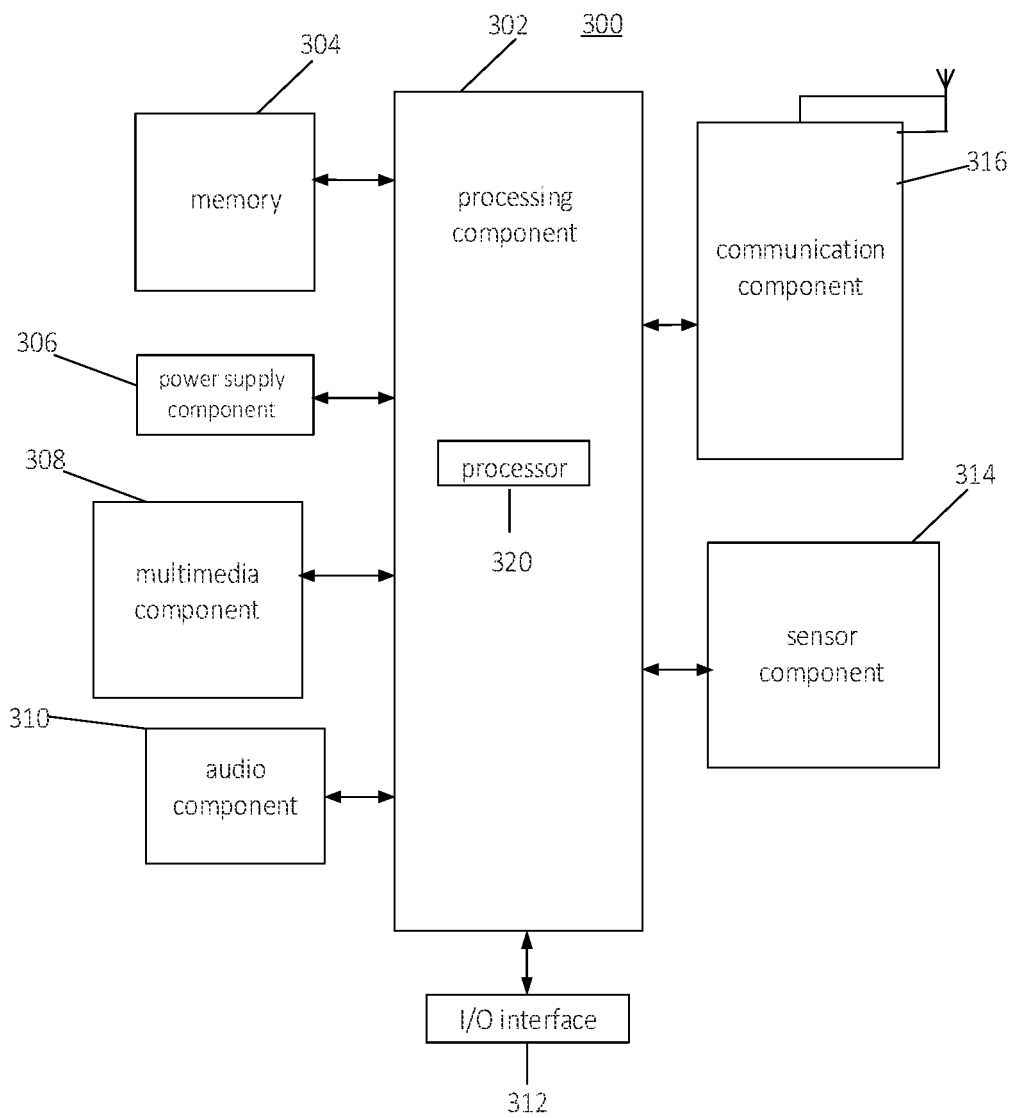
FIG. 6 is a block diagram illustrating a beam management device according to some embodiments.

FIG. 6 is a block diagram illustrating a beam management device 300 according to some embodiments. For example, the device 300 may be a mobile phone, a computer, a digital broadcast terminal, a messaging device, a game console, a tablet device, a medical device, a fitness device, a personal digital assistant, and the like.

As illustrated in FIG. 6, the device 300 may include one or more of the following components: a processing component 302, a memory 304, a power supply component 306, a multimedia component 308, an audio component 310, an input/output (I/O) interface 312, a sensor component 314, and a communication component 316.

The processing component 302 generally controls the overall operation of the device 300, such as operations associated with display, phone calls, data communications, camera operations, and recording operations. The processing component 302 can include one or more processors 320 to execute instructions to perform all or some of the steps of the methods described above. Additionally, processing component 302 may include one or more modules that facilitate interaction between processing component 302 and other components. For example, processing component 302 may include a multimedia module to facilitate interaction between multimedia component 308 and processing component 302.

The memory 304 is configured to store various types of data to support operations of the device 300. Examples of such data include instructions for any application or method operating on the device 300, contact data, phonebook data, messages, pictures, videos, and the like. Memory 304 may be implemented by any type of volatile or non-volatile storage device or combination thereof, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory. Magnetic Disk or Optical Disk.

The power supply component 306 provides power to various components of the device 300. The power supply component 306 may include a power management system, one or more power supplies, and other components associated with generating, managing, and distributing power to the device 300.

The multimedia component 308 includes a screen that provides an output interface between the device 300 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensors can sense not only the boundaries of a touch or swipe action, but also the duration and pressure associated with the touch or swipe action. In some embodiments, the multimedia component 308 includes a front-facing camera and/or a rear-facing camera. When the device 300 is in an operation mode, such as a shooting mode or a video mode, the front-facing camera and/or the rear-facing camera may receive external multimedia data. Each of the front-facing and rear-facing cameras can be a fixed optical lens system or have focal length and optical zoom capability.

The audio component 310 is configured to output and/or input audio signals. For example, audio component 310 includes a microphone (MIC) that is configured to receive external audio signals when the device 300 is in operating modes, such as call mode, recording mode, and voice recognition mode. The received audio signal may be further stored in the memory 304 or transmitted via the communication component 316. In some embodiments, the audio component 310 also includes a speaker for outputting audio signals.

The I/O interface 312 provides an interface between the processing component 302 and a peripheral interface module, which may be a keyboard, a click wheel, a button, and the like. These buttons may include, but are not limited to: home button, volume buttons, start button, and lock button.

The sensor component 314 includes one or more sensors for providing status assessment of various aspects of the device 300. For example, the sensor component 314 can detect the on/off state of the device 300, the relative positioning of components, such as the display and keypad of the device 300, the sensor component 314 can also detect a change in the position of the device 300 or a component of the device 300, the presence or absence of contact with the device 300, the orientation or acceleration/deceleration of the device 300 and the temperature change of the device 300. The sensor component 314 may include a proximity sensor configured to detect the presence of nearby objects in the absence of any physical contact. The sensor component 314 may also include a light sensor, such as a CMOS or CCD image sensor, for use in imaging applications. In some embodiments, the sensor component 314 may also include an acceleration sensor, a gyroscope sensor, a magnetic sensor, a pressure sensor, or a temperature sensor.

The communication component 316 is configured to facilitate wired or wireless communication between the device 300 and other devices. The device 300 may access a wireless network based on a communication standard, such as Wi-Fi, 2G or 3G, or a combination thereof. In one embodiment, the communication component 316 receives broadcast signals or broadcast related information from an external broadcast management system via a broadcast channel. In an embodiment, the communication component 316 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the device 300 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component implementation for performing the above method.

In some embodiments, there is further provided a non-transitory computer-readable storage medium including instructions, such as the memory 304 including instruction. The instruction are executed by a processor 320 of the device 300 to execute the above-mentioned method. For example, the non-transitory computer-readable storage medium may be ROM, random access memory (RAM), CD-ROM, tape, floppy disk, optical data storage device or the like.

Figure 7:
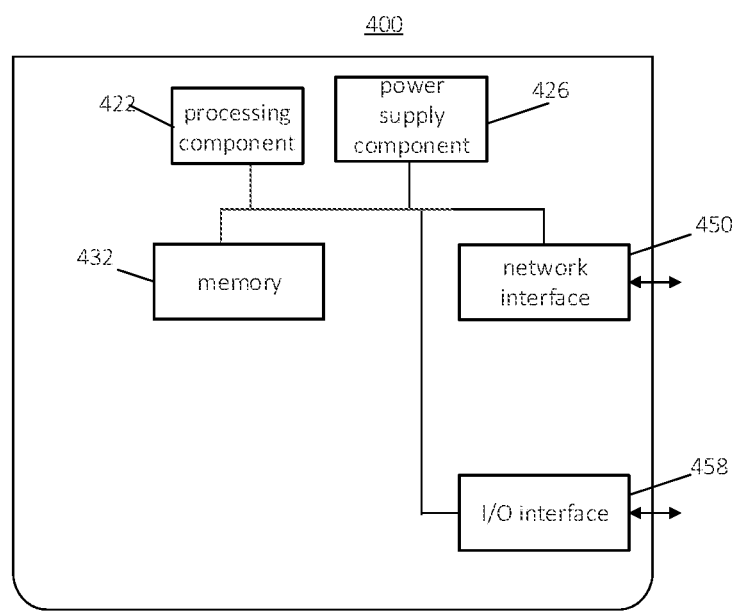
FIG. 7 is a block diagram illustrating a beam management device according to some embodiments.

FIG. 7 is a block diagram illustrating a beam management device 400 according to some embodiments. For example, the device 400 may be a network device, such as a base station. As illustrated in FIG. 7, the device 400 includes a processing component 422, which further includes one or more processors, and a memory resource represented by a memory 432 for storing instructions executable by the processing component 422, such as an application program. The application program stored in the memory 432 may include one or more modules, each corresponding to a set of instructions. Additionally, the processing component 422 is configured to execute instructions to perform the above-described methods.

The device 400 may include a power component 426 configured to perform power management of the device 400, a wired or wireless network interface 450 configured to connect the device 400 to the network, and an input/output (I/O) interface 458. The device 400 may operate based on an operating system stored in the memory 432, such as Windows Server™, Mac OS X™, Unix™, Linux™, FreeBSD™ or the like.

In an example, there is also provided a non-transitory computer-readable storage medium including instructions, such as the memory 432 including instructions, executable by the processing component 422 of the device 400 to perform the method described above. For example, the non-transitory computer-readable storage medium may be ROM, random access memory (RAM), CD-ROM, magnetic tape, floppy disk, optical data storage device, and the like.

It is understandable that in the disclosure, "plurality" refers to two or more, and other quantifiers are similar. The term "and/or" describes the association relationship of the associated objects and means that there can be three kinds of relationships. For example, A and/or B means only A, only B, or both A and B. The character "/" generally indicates that the associated objects are an "or" relationship. The singular forms "a." "the," and "an" are intended to include the plural forms as well, unless the context clearly dictates otherwise.

It is further understandable that the terms "first", "second", etc. are used to describe various information, but the information should not be limited to these terms. These terms are only used to distinguish the same type of information from one another, and do not imply a particular order or level of importance. In fact, the expressions "first", "second" etc. can be used interchangeably. For example, the first information may also be referred to as the second information, and similarly, the second information may also be referred to as the first information, without departing from the scope of the disclosure.

It is further understandable that, although the operations in the embodiments of the disclosure are described in a specific order in the drawings, it should not be construed as requiring that the operations be performed in the specific order shown or the serial order, or requiring to perform all operations shown to obtain the desired result. In certain circumstances, multitasking and parallel processing may be advantageous.

Other embodiments of the disclosure will readily occur to those skilled in the art upon consideration of the specification and practice of the disclosure disclosed herein. This disclosure is intended to cover any variations, uses, or adaptations of the disclosure that follow the general principles of the disclosure and include common knowledge or techniques in the technical field not disclosed by the disclosure. The specification and examples are to be regarded as example only, with the true scope and spirit of the disclosure being indicated by the following claims.

It is understandable that the disclosure is not limited to the precise structures described above and illustrated in the accompanying drawings, and that various modifications and changes may be made without departing from the scope thereof. The scope of the disclosure is limited only by the appended claims.

What is claimed is:

1. A beam management method, performed by a first device, the method comprising:
receiving reference signal configuration information, wherein the reference signal configuration information is used for configuring a plurality of reference signals and a beam corresponding to each reference signal, the reference signal configuration information is used for configuring repetition mode, time domain location, frequency domain location and reference signal identifiers (ID), and the reference signal configuration information is used for configuring cell ID or transmission reception point (TRP) ID corresponding to the reference signal; and
measuring one or more arrival paths corresponding to each reference signal based on the reference signal configuration information, and sending a measurement report, wherein the measurement report comprises first arrival path information corresponding to each reference signal;
wherein the first arrival path information comprises time-of-flight information of the reference signal on each corresponding arrival path, and the time-of-flight information comprises a relative time-of-flight value; and
the first arrival path information indicates whether an arrival path of the reference signal is a first arrival path.

2. The method of claim 1, wherein the time-of-flight information comprises sorting information obtained by sorting a plurality of arrival paths according to the time-of-flight information.

3. The method of claim 1, wherein the time-of-flight information comprises time-of-flight values that further comprise at least one of a specified value or relative values relative to the specified value.

4. The method of claim 1, wherein the time-of-flight information comprises an absolute time-of-flight value that corresponds to a reference signal with a shortest time-of-flight.

5. The method of claim 1, wherein the time-of-flight information comprises a one-way time-of-flight or a two-way time-of-flight.

6. The method of claim 1, wherein the measurement report further comprises one or more reference signal identifiers.

7. The method of claim 6, wherein a reference signal identifier of the one or more reference signal identifiers is determined based on at least one of a signal strength value or a time-of-flight.

8. The method of claim 7, wherein the one or more reference signal identifiers correspond to at least one of:
one or more reference signals with a strongest signal strength value among measured signal strength values,
one or more reference signals with a shortest time-of-flight among measured time-of-flight; or
one or more reference signals with a maximum weighted sum of measured signal strength value and measured time-of-flight.

9. A non-transitory computer-readable storage medium, wherein when instructions stored in the storage medium are executed by a processor of a device, the device is caused to execute the beam management method of claim 1.

10. A beam management method, performed by a second device, the method comprising:
sending reference signal configuration information, wherein the reference signal configuration information is used for configuring a plurality of reference signals and a beam corresponding to each reference signal, the reference signal configuration information is used for configuring repetition mode, time domain location, frequency domain location and reference signal identifiers (ID), and the reference signal configuration information is used for configuring cell ID or transmission reception point (TRP) ID corresponding to the reference signal; and
receiving a measurement report obtained and sent by measuring one or more arrival paths corresponding to each reference signal by a first device based on the reference signal configuration information, wherein the measurement report comprises first arrival path information corresponding to each reference signal,
wherein the first arrival path information comprises time-of-flight information of the reference signal on each corresponding arrival path, and the time-of-flight information comprises a relative time-of-flight value; and
the first arrival path information indicates whether an arrival path of the reference signal is a first arrival path.

11. The method of claim 10, wherein the time-of-flight information comprises sorting information obtained by sorting a plurality of arrival paths according to the time-of-flight information.

12. A beam management device, comprising:
a processor; and
a memory for storing instructions executable by the processor;
wherein the processor is configured to execute the beam management method of claim 10.

13. A non-transitory computer-readable storage medium, wherein when instructions stored in the storage medium are executed by a processor of a device, the device is caused to execute the beam management method of claim 10.

14. A beam management device, comprising:
a processor; and
a memory for storing instructions executable by the processor;
wherein the processor is configured to:
receive reference signal configuration information, wherein the reference signal configuration information is used for configuring a plurality of reference signals and a beam corresponding to each reference signal, the reference signal configuration information is used for configuring repetition mode, time domain location, frequency domain location and reference signal identifiers (ID), and the reference signal configuration information is used for configuring cell ID or transmission reception point (TRP) ID corresponding to the reference signal; and measure one or more arrival paths corresponding to each reference signal based on the reference signal configuration information, and send a measurement report, wherein the measurement report comprises first arrival path information corresponding to each reference signal, wherein the first arrival path information comprises time-of-flight information of the reference signal on each corresponding arrival path, and the time-of-flight information comprises a relative time-of-flight value; and the first arrival path information indicates whether an arrival path of the reference signal is a first arrival path.

* * * * *